(12) United States Patent
Vamvas (10) Patent No.: US 10,033,306 B2
(45) Date of Patent: Jul. 24, 2018

(54) OCEAN WAVE ENERGY CONVERTER UTILIZING TEMPORARY IMMOBILIZATION OF A FLOAT

(71) Applicant: Vassilios Vamvas, Bedford, MA (US)

(72) Inventor: Vassilios Vamvas, Bedford, MA (US)

( * ) Notice: Subject to any disclaimer, the term of this patent is extended or adjusted under 35 U.S.C. 154(b) by 1053 days.

(21) Appl. No.: 14/261,418

(22) Filed: Apr. 24, 2014

(65) Prior Publication Data

US 2014/0327338 A1 Nov. 6, 2014

Related U.S. Application Data

(60) Provisional application No. 61/816,015, filed on Apr. 25, 2013.

(51) Int. Cl.
| | |
|---|---|
| *F03B 13/18* | (2006.01) |
| *F03B 15/00* | (2006.01) |
| *H02N 11/00* | (2006.01) |
| *F03B 13/14* | (2006.01) |
| *F28D 20/02* | (2006.01) |

(52) U.S. Cl.
CPC ......... *H02N 11/002* (2013.01); *F03B 13/142* (2013.01); *F03B 13/1815* (2013.01); *F03B 15/00* (2013.01); *F28D 20/021* (2013.01); *F28D 20/028* (2013.01); *F05B 2260/42* (2013.01); *Y02E 10/38* (2013.01); *Y02E 60/145* (2013.01)

(58) Field of Classification Search
CPC .......... F03B 13/12–13/24; Y02E 10/30; Y02E 10/32; Y02E 10/38
See application file for complete search history.

(56) References Cited

U.S. PATENT DOCUMENTS

| | | | | |
|---|---|---|---|---|
| 1,816,044 | A * | 7/1931 | Gallagher | F03B 13/186 60/506 |
| 4,145,885 | A * | 3/1979 | Solell | F03B 13/1855 290/53 |
| 4,599,858 | A * | 7/1986 | La Stella | F03B 13/186 290/42 |
| 5,921,082 | A * | 7/1999 | Berling | F03B 13/1815 290/42 |
| 6,109,029 | A * | 8/2000 | Vowles | B01D 61/10 270/42 |
| 2003/0110767 | A1 * | 6/2003 | Lee | F03B 13/1815 60/495 |
| 2012/0119624 | A1 * | 5/2012 | Vamvas | H02N 2/18 310/339 |

* cited by examiner

*Primary Examiner* — Laert Dounis (57) ABSTRACT

A float operated lever device for wave energy conversion comprising at least one force amplifying lever, a pivot secured on a secured platform, a buoyant float attached to said lever and a latch means secured in position for obstructing the motion of said force amplifying lever for a fraction of half wave's period, when said float is nearly at its highest and lowest positions whereby said force amplifying lever travels downward or upward respectively, at a greater velocity and for a greater distance than in the case of free floating thus producing an amplified output force, pivoting speed and angular displacement.

A method for thermal energy storage and retrieval of electricity in phase change material.

5 Claims, 4 Drawing Sheets

OCEAN WAVE ENERGY CONVERTER UTILIZING TEMPORARY IMMOBILIZATION OF A FLOAT

CROSS-REFERENCE TO RELATED APPLICATIONS

This application claims the benefit of U.S. provisional patent application Ser. No. 61/816,015, filed 2013 Apr. 25 by the present inventor. Also, this application claims the benefit of U.S. patent application Ser. No. 20120104761 submitted by the same inventor and incorporated hereinby reference in its entirety. Also, this application claims the benefit of U.S. patent application Ser. No. 20120119624 submitted by the same inventor and incorporated herein by reference in its entirety.

FIELD OF USE

The present device transforms the rise and fall of ocean waves to different forms of energy. The device includes a float, a lever and a latching means and is capable of storing the energy transformed into a usable form.

BACKGROUND OF THE INVENTION

Renewable energy has been in the epicenter interests of energy policy makers in the recent years. However, some forms of renewable energy have received more attention than others. For example, solar, wind and geothermal energy have been in the "spot light", leaving ocean wave energy behind. This is because the ocean wave energy industry has not yet been able to demonstrate a wave energy converter that overcomes the fundamental challenges being encountered by the existing devices, in order for ocean wave energy to be considered as a reliable renewable energy source. Existing ocean wave energy technologies need to address serious obstacles, which create vital barriers in their commercialization, such as:

(a) very large geometric size of the devices, which leads to high costs, (b) difficulty of accessing the devices, which makes very costly their corrective and preventive maintenance, (c) high cost of subcomponents due to non-conventional materials in use for underwater operation, (d) high risks of operating these devices in harsh ocean conditions, which may lead to a short life-cycles, (e) low overall efficiency, due to the fact that in most of the devices, the useful electricity finally available after being processed for quality standards (grid quality), is many times less than the electricity initially produced by the converter, (f) high cost/kilowatt produced due to high device construction costs.

Therefore, there is a need for an ocean wave energy converter having a reasonable size for a significant electricity output of acceptable quality standards, providing easy access for maintenance, made out of conventional components, operating without risk in harsh ocean conditions thus achieving long device life-cycles.

To utilize conventional subcomponents and have easy access for maintenance, ocean wave power transmission, at the most part, needs to take place out of the water. This is achievable with the use of a lever, which has as an input force, the buoyancy force exerted by the waves on a float, attached on the lever, and the float's weight.

In the present invention, a float is attached to the lever's end facing the ocean water. The lever is used to transform the ocean wave energy to mechanical energy, which then can be used for several purposes such as electricity production by using a generator for the electricity grid or local use, or energy storage, for example in the form of a compressed gas in a tank, or thermal energy. Although due to the principle of energy conservation the output energy of a lever is equal to the input energy, still they provide the mechanical advantage of multiplying the input force. Mechanical advantage is only provided by levers of Class 1 or 2. Class 1 levers have the input force (the effort) in the one end, the fulcrum in the middle, and the load in the other end. The force closest to the fulcrum, although it moves a shorter distance, is greater and creates the mechanical advantage generated by the lever. Class 2 levers have the input force in the one end again, the load in the middle and the fulcrum at the other end. They also provide mechanical advantage. Levers of Class 3 have the input force (the effort) in the middle and they do not provide mechanical advantage. A wrench provides mechanical advantage and can be thought as a synthesis of Class 1 and Class 2 levers, having the input force (the effort) in the one end of the wrench and the point that does not move, the fulcrum, proximate to the other end. Class 1 or 2 levers can be used to overcome heavier loads, such as the torque of a high power output generator, or the pressure (PSI) of a tank already containing a substantial mass of a compressed gas etc.

The renewable energy industry is striving to produce higher power output, in order to contribute significantly in today's energy needs. Existing ocean wave energy devices have very large geometric sizes in order to provide with significant energy. The large size is needed to overcome a substantial load, for example a very large torque of a generator or a large resistance force of a pump. The use of a Class 1, or 2, lever can provide with the large forces needed to overcome a large torque or a large resistance force.

Another advantage of using a lever is that it can make possible to convert ocean wave energy into a usable energy by using only solid mechanical parts for power transmission and without involving hydraulic linkages, utilizing pistons and fluids. Mechanical power transmission, using only mechanical components, is simpler and has less power losses than involving hydraulic linkages. If a mechanical energy, generated by a prime mover such as a float, is converted into fluid flow in the process of its conversion into usable energy, it suffers more losses, due to leakages, than if solid mechanical components were used instead.

Another broad aspect of the present invention is a novel device used for (i) protecting a heaving-float-based ocean wave energy converter from harsh conditions and (ii) providing to it a more standardized environment of operation versus the unpredictable nature of the waves. The device is a caisson-like structure, secured in position at the seabed.

The structure allows the ocean water to enter and exit from it through an at least one opening on its side walls. The side walls extend higher than the highest wave, and the at least one opening's uppermost point is as at most as high as the height of the lowest wave. The ocean water creates an oscillating water column inside the structure, due to the principle of the connected vessels.

U.S. Patent Application No. 2009/0021017 describes a wave power apparatus which includes a plurality of rotationally supported arms, each of which carries a float at its free end so that a translational movement of the float caused by a wave, results in rotation of the arm. The electricity is produced by using a hydraulic motor and a hydraulic medium.

U.S. Pat. No. 4,203,294 describes a buoy, at least partially submerged in the sea, containing a hydraulic cylinder and piston device, where the piston is fixed to a wire connected to the seabed. The buoy may be kept in a fixed vertical position, by locking the piston to the cylinder by a brake or a valve, thus controlling the rotational movement of an electric generator, through at least one fluid under controlled circulation within the water displacing member.

U.S. Patent Application No. 2011/0030365 discloses an energy production system comprising at least one liquid reservoir having a predetermined arrangement of inlet and outlet to provide periodically changes in a liquid level, at least one float, at least partially immersed in liquid within the liquid reservoir, a lock system and a controller. The mechanical power produced by the vertical motion of the float, may be transformed to electrical power by using a generator, which is attached to the float.

The intermittencies of renewable sources have created a need for energy storage and release, when energy is demanded. Energy storage can provide a solution to the renewable energy intermittencies. In addition, electric energy storage, produced by a renewable energy converter, may increase the converter's overall efficiency. This is because the electricity initially produced by most renewable energy converters, requires further processing, mainly through costly power electronics, in order to become usable. During this processing though, a substantial quantity of electric power is lost. For example, most of wave energy converters, due to the variability of the heights and frequencies of the waves, initially produce not-usable electricity or electricity of grid quality. This electricity requires further processing, to become usable. The quantity, though, of the finally produced usable electricity is less than the quantity of the initially generated not-usable electricity. Therefore, if there was a way to store this initially produced, not-usable energy, in an energy storage device, and retrieve it later as usable electricity, with the reasonable loses of the retrieval process, we would achieve on-demand energy from the renewable source. The present teaching describes two novel methods of such energy storage. Both methods disclose how to store not-usable electricity in the form of thermal energy and how to retrieve the thermal energy stored, efficiently. Once the thermal energy is retrieved, a conventional method of generating electricity from heat, such as a steam blower driving a steam turbine can be used to generate usable electricity. The same methods can be used to store even usable electricity, when not needed by the current demand, for an on-demand later use.

Latent heat can be produced by a phase change material (PCM). The use of a PCM, for thermal energy storage and retrieval, provides the advantages of (i) high energy density and (ii) isothermal behavior during thermal charging and discharging. In prior art, thermal energy storage systems utilize heat exchangers, submerged in a PCM for adding and removing thermal energy. It is well known in the art that removal of thermal energy from a PCM material, such as a nitrate salt, causes the salt to solidify on the heat exchanger surfaces. Such PCM materials have very low thermal conductivity when in solid phase. Therefore, when a PCM solidifies on a heat exchanger surface, during a thermal energy retrieval cycle (discharge), it lowers the thermal conductivity factor drastically. Since the heat transfer rate to a substance is directly proportional to the surface area of the substance and the thermal conductivity factor, the heat power transfer rate declines critically, deteriorating the heat exchanger's effectiveness substantially. Therefore, there is a need for a method to provide an efficient retrieval of thermal energy stored in a PCM by a prime source of electricity such as a not-usable source of electricity initially produced by a renewable source. Since these methods, disclosed herein, are capable of handling a source of not-usable electricity, it is easy to understand that they can also handle usable electricity as well.

SUMMARY

The device subject of this disclosure relates to a wave energy converter which includes at least one force amplifying lever, with one end facing the ocean and one opposite end. A float is attached to the ocean end. The lever is pivotally attached to a fulcrum, which is secured on a platform, supported by the earth and extended above the surface of the highest wave. The lever, being a force amplifying lever, has the fulcrum pivotally attached close to, or on the opposite end. Thus, the lever applies most, or all, of its weight on the float, subjecting it to the buoyant forces of the waves. When the water goes up the float, forced by buoyancy, pushes the ocean end of the lever upward. When the water goes down, the float being forced by its weight and the lever's weight goes downward. The platform can be a platform supported by piles or a caisson-like structure, as described above, in the sea. Also the platform could be a breakwater, a pier, a jetty or an oil rig. The wave energy converter further includes a latch means, which locks the lever from moving, for a fraction of half wave's period. When the lever is near to its highest position, the latch means locks the lever from moving for a few moments and unlocks it when the water recedes to its minimum level. Thus, the lever is freed to move downward by the total force of the lever's weight and the float's weight. This force is amplified by the lever and applied onto a load. Therefore, the force amplifying lever has the advantage to move with a force much larger than the effort force a load attached to it. Similarly, when the lever is near to its lowest position, the latch means locks the lever again from moving, for some moments, until the water elevates to its maximum level and then, the latch means unlocks the lever. These moments last less than half of the wave's period, as well. When the latch means unlocks the lever, the input force to the lever now is the buoyancy force on the float minus the total force of the lever's weight and the float's weight. This input force is transferred, amplified, to the load attached to the lever.

An embodiment utilizes a plurality of such levers with corresponding floats, applying their amplifying forces onto one load, at different time instances as follows. This embodiment is configured so as each lever's float is in contact with a wave at a different instant during the wave's period. This can be accomplished with two ways: by (i) either use a plurality of levers with the same length, positioned not in parallel to the direction of the waves or (ii) a use a plurality levers, which do not have the same length, in parallel to the direction of the waves, as it has been described in U.S. patent application Ser. No. 20120104761, submitted by the same inventor and incorporated herein by reference in its entirety. Such pluralities of such levers, applied to one load, at different time instances, generate a substantial quantity of power.

The float operated lever device described, in addition to generating much larger forces than the effort force applied on the lever, it also enables the use of exclusively solid mechanical means for power transmission. The device does not involve any hydraulic means in the transmission of power from the waves to the load. This minimizes the power losses that would otherwise be created, if for instance, hydraulic linkages were involved, thus achieving better device efficiency. Furthermore, the device design enables the power transmission process to take place out of the water, thus allowing for the use of conventional materials for the device construction as well as easy maintenance accessibility, lowering the overall cost per kilowatt.

An embodiment of this device has the form of a wrench. The load to the wrench-like device can be either a double acting pump for gas compression in a gas compression tank, or a rotating shaft, which, by utilizing mechanical means, can force on rotation the rotor shaft of a rotational generator. In the latter case, the generator' rotation in an embodiment is a unidirectional rotation, stemming from both the upwards and downwards wrench-lever strokes.

An embodiment utilizes a flywheel, which is set in rotation by the unidirectional strokes of both the upward and downward movement of the lever. Yet another embodiment utilizes a dual rotor generator, for contra-rotational electricity generation, as described in U.S. patent application Ser. No. 20120104761 submitted by the same inventor and incorporated herein by reference in its entirety. Also in another embodiment using a contra-rotational generator, the upward stroke rotates the one rotor in one direction and the downward stroke rotates the other rotor in the opposite direction. In an embodiment each one of the dual rotors has its own supporting flywheel.

Another embodiment is equipped with a mass attached on the lever's ocean end. Yet another embodiment utilizes mechanical or electromagnetic latch means, activated by a controller, further included in the device. The controller is connected with sensors monitoring the forces exerted to the lever by buoyancy or the weights applied. Other sensors may be included monitoring additional parameters. As an example, of such a sensor is a radar water level sensor, which can monitor the level of the upcoming wave, for system optimization.

In the present disclosure, a durable and rigid caisson-like structure, made out of concrete or metal, fixed on the seabed, is used to protect a float of a heaving-float-based ocean wave energy converter. This structure has at least one opening on its side walls in order to allow the ocean water to enter the structure. The height of this opening is at most as high as the lowest wave. The side walls of the structure extend at a height higher than the highest wave. The ocean water in the structure moves up and down forming an oscillating water column, due to the wave activity and the principle of the connected vessels. The oscillating water column provides a heaving motion for the float. The float is used to activate a power transmission mechanism of an ocean wave energy converter. The structure provides a protective environment for the float, even in harsh conditions. Also, the structure provides a standardized environment of operation, through the oscillating water column. The caisson-like device can have further stability by being attached to a breakwater, a seawall, a pier etc.

In an embodiment the structure may be open in the bottom and/or top. In another embodiment, the structure has the form of a barrel. In another embodiment the structure has the form of a boat, thus avoiding a front wall, open at the bottom (sunk boat).

In a further embodiment the caisson-like structure is open or closed from the bottom having the top enclosed. Yet in another embodiment the caisson-like structure has a horizontal platform inside, secured on the side walls and placed higher than the highest wave level, used to support a float-based ocean wave energy converter whereby said float-based wave energy converter, has most of its power transmission out of the water and is protected from harsh ocean conditions.

Also in the present invention a method for the storage in a phase change material (PCM) of electric energy, such as the energy initially produced by a wave energy converter, in the form of thermal energy and the retrieval of the stored energy is disclosed.

Electric heating elements, suitable to heat a PCM, with a wide range of operational values for specification parameters such as voltage, current, frequency, temperature and power, in order to comply with the broad range of values of the parameters of the electricity initially produced by a renewable source, are used. An example of such heating elements are thermal resistors and their electric conductive part can be made of copper or steel.

The heating elements are electrically connected to the electricity output of a renewable source, such as an ocean wave energy to electricity converter. The renewable source, when in action, produces electricity, usually not of acceptable standards, as described above, and the connected heating element transforms this electricity to heat which is stored in a PCM. Thermal energy, when added to a PCM by a heating element, causes the PCM to absorb at least some thermal energy in an amount equal to its latent heat of fusion and accordingly change phase, usually from solid to liquid. Thermal energy, when retrieved from the PCM causes the PCM to release its latent heat of fusion and accordingly to return to the previous phase, usually from liquid to solid.

The PCM is enclosed in an at least one container. Proximate to the container walls, outside or inside, there is at least one heating element. The container is submerged in a tank containing heat transfer fluid. When electricity activates the at least one heating element it produces heat, which is absorbed by the PCM. The heat absorbed by the PCM is transferred to the heat transfer fluid through the container walls. In a heat discharge cycle, the heat of the heat transfer fluid is transferred to a conventional thermal-energy-to-electricity producing system through a heat exchange means. A conventional thermal energy-to-electricity production system may be a steam generator, which drives a steam turbine in an electrical power plant. The at least one heating element, being proximate to the container walls prevents the PCM to solidify, during the discharge cycle. In order to prolong such a thermal retrieving process, even when the prime electricity source is not in action, the container interior is equipped with thermal conductive fins to facilitate heat transfer to the walls of the container from all the quantity of the PCM enclosed. Thermal conductive fins can be made of aluminum, graphite etc.

An embodiment comprises at least one tank containing a heat transfer fluid. At least one container containing a PCM and at least one heating element electrically connected to a prime source of electricity is at least partially submerged into said at least one tank containing said heat transfer fluid. In a thermal charge cycle, the prime source of electricity activates said at least one heating element, adding thermal energy to said PCM. Said PCM turns from solid to liquid, when said prime source of electricity produces adequate power for said PCM's phase change. Said PCM's heat is transferred to said heat transfer fluid. In a thermal discharge cycle, thermal energy is retrieved from said heat transfer fluid by a heat exchanger in fluid communication with said at least one tank. During the discharge cycle, a portion of said heat transfer fluid is circulated through an outgoing flow path and returns, cooled, back to said tank through a returning flow path. The heat transfer fluid is selected so as to not solidify, in the operating temperatures. Therefore, the method benefits from the use of PCM, while avoiding PCM solidification on the surface of the heat exchanger, and consequently the deterioration of the heat exchange rate. In accordance with an embodiment, said at least one PCM container has a cylindrical shape. Yet another embodiment comprises a plurality of PCM containers with cylindrical shape, whereby the heat transfer surface between said plurality of PCM cylindrical containers and said heat transfer fluid is maximized, thus greatly enhancing the thermal transferring efficiency of the device. A heat exchanger is used to produce steam for a steam turbine in an electrical power plant.

In another embodiment, a novel heating element can be used, instead of a commercially available heating element. This novel heating element consists of the same dielectric material, as in the commercial one, covering an electric conductive material, which is producing the heat from electricity. The conductive material can be in the form of stripes, rods etc. and is used as an integral part of the wall of the novel heating element. The novelty of this heating element is that it forms a container, itself, which is filled with a PCM. This heating element-container is submerged in a heat transfer fluid. When the heating element-container is activated by the prime source of electricity, it transfers thermal energy both inside the container in the PCM and outside of the walls of the container, in the heat transfer fluid. Highly thermal conductive metal fins, in direct contact with the inside wall of the novel heating element-container, can also be used to provide the capability of retrieving thermal energy stored in the whole volume of the PCM, rather than from the PCM volume in proximity to the container's walls, thus preventing the PCM from solidifying on the heating element-container's inside wall, during a thermal retrieving process, even when the prime source of electricity is not in action.

Another embodiment comprises a controller, which secures the at least one heating element's function within operational limits and optimizes a thermocline within the heat transfer fluid in the at least one tank, controlling points such as pumps, valves, thermostats etc. Thermocline optimization is accomplished by changing the location whereat the heat transfer fluid is extracted, the location whereat the heat transfer fluid is returned to the tank and by changing the flow rate of the heat transfer fluid extracted from and/or returned to the tank.

DETAILED DESCRIPTION

While multiple embodiments of the instant invention are disclosed, alternate embodiments may become apparent to those skilled in the art. The following detailed description describes only illustrative embodiments of the invention, with reference to the accompanying drawings wherein like elements are designated by like numerals. It should be clearly understood that there is no intent, implied or otherwise, to limit the invention in any form or manner to that described herein. As such, all alternatives and methods are considered as falling within the spirit, scope and intent of the instant invention.

Figure 1:
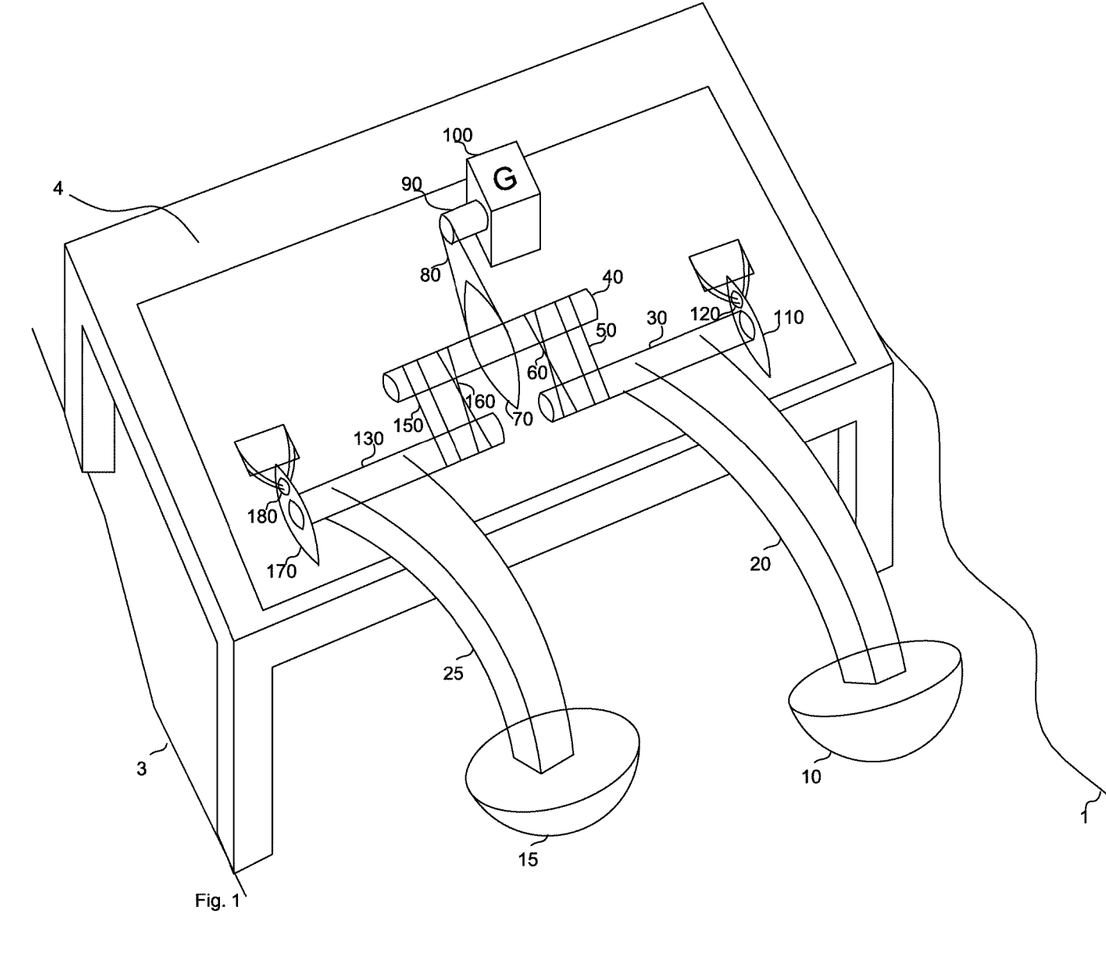
FIG. 1 shows two float operated lever devices acting upon a single load

FIG. 1 shows an upper-front perspective view of a two-lever wrench-like system and a power transmission mechanism, which has only solid parts, secured on platform 4, which is secured on seabed 3. Platform 4 is higher than the highest wave. The two-lever wrench-like system is acting on a single load, which is the rotor of generator 100. Waves 1, act upon floats 10 and 15, which move levers 20 and 25 respectively. Consequently, lever 20, rotates shaft 30, up and down. The rotation of shaft 30, moves chains 50 and 60, attached upon corresponding one-way freewheels. These freewheels (not shown in this figure, but they are shown and discussed in detail in FIG. 2) are fixed on shaft 30, so as to rotate at opposite directions, succeeding a unidirectional rotation of shaft 40, as described in detail in the description of FIG. 2 further down. Chains 50 and 60 act upon shaft 40, through another set of one-way freewheels (shown in FIG. 2, as welt), fixed on shaft 40 and placed to rotate in the same direction, also shown in FIG. 2. Fixed on shaft 40 is also flywheel 70. Flywheel 70 rotates generator shaft 90 through chain 80. Brake system 120 acts upon disk brake 110, which is fixed on shaft 30. Brake system 120 is activated only for a few moments when float 10 is in its upper most point, or lower most point, as it is explained further down in the description of FIG. 2 Similarly, lever 25 rotates shaft 130, upward and downward. Shaft 130 moves chains 150 and 160, attached upon corresponding one-way freewheels, fixed on shaft 130, so as to rotate at opposite directions. Chains 150 and 160 act upon shaft 40, through another set of one way freewheels, fixed on shaft 40 and placed to rotate in the same direction. Flywheel 70 rotates generator shaft 90 through chain 80, thus giving additional rotation to shaft 90, to the rotation which received from lever 20. This is because levers 20 and 25 have different length so as to move up and down at different instances in a wave's period, as it was described in U.S. patent application Ser. No. 20120104761 submitted by the same inventor and incorporated herein in its entirety. Brake system 180 acts upon disk brake 170, which is fixed on shaft 130. Brake system 180 is activated only for a few moments when float 15 is in its upper most point, or lowermost point, as described further down.

Figure 2:
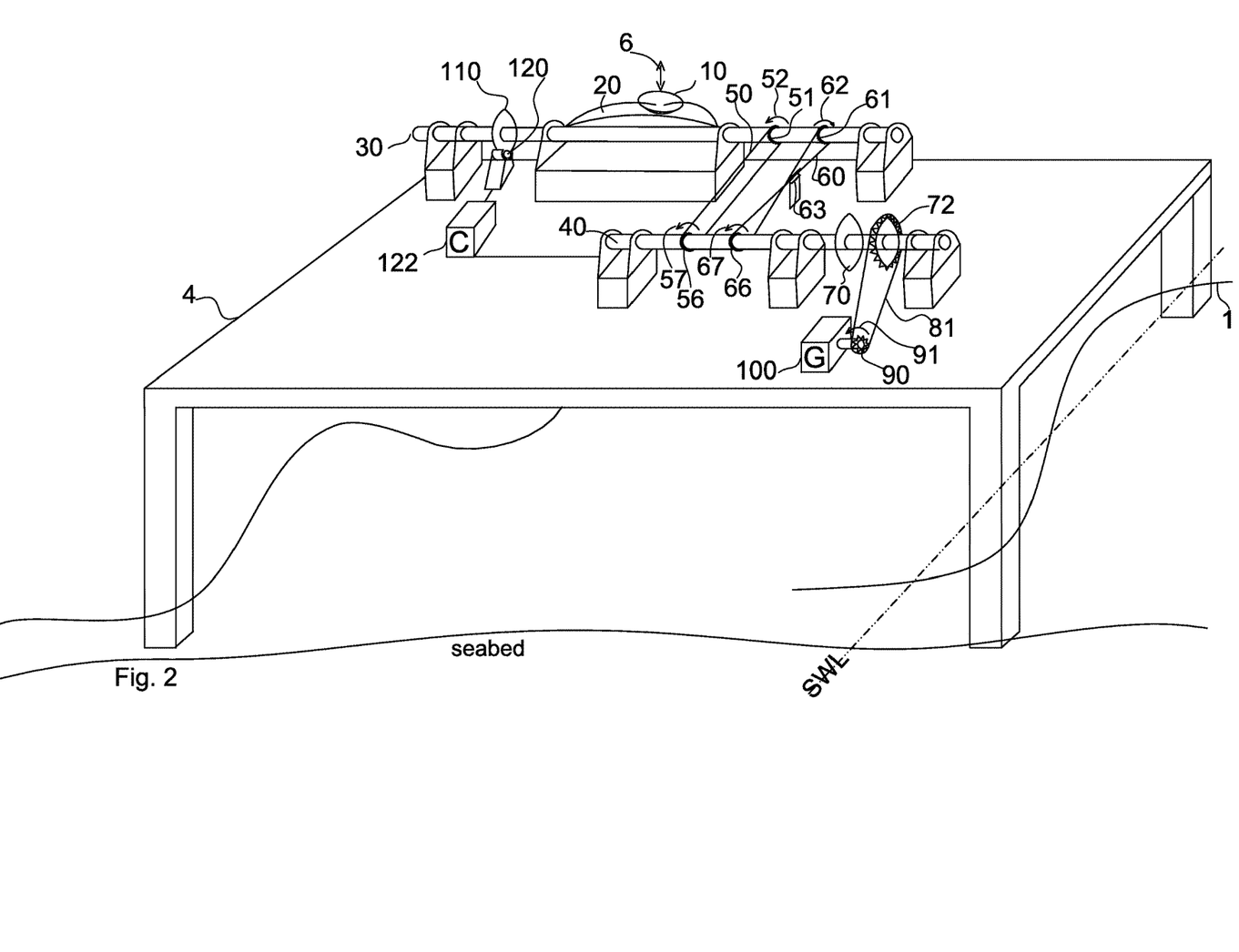
FIG. 2 shows the power transmission mechanism of a float operated lever device FIG. 3 a caisson-like structure providing protection and standardized environment to a float FIG. 4 a cylinder containing a phase change material and an electric heating element

FIG. 2 shows a one lever system's perspective view from the back side. Float 10, on top of the figure, moves up and down, as shown by arrows 6, forced by waves 1. Therefore, lever 20, attached on float 10, moves up and down as well. Lever 20 is fixed on shaft 30. Shaft 30, secured well on platform 4, is forced to rotate back and forth forced by lever 20. Shaft 30 has one-way freewheel 51 fixed to it as well. When the lever goes up, one-way freewheel 51 forces chain 50 to move in the direction of arrow 52. One-way freewheel 51 moves freely in the opposite direction of the direction indicated by arrow 52. When lever 20 goes up, chain 50 forces also one-way freewheel 56, which is fixed on shaft 40, to move in the direction of arrow 57. One-way freewheel 56 moves freely in the opposite direction of arrow 57, without forcing chain 50 or shaft 40 to move. When lever 20 goes down, one-way freewheel 61, which is fixed on shaft 30, forces chain 60 to move in the direction of arrow 62. One-way freewheel 61 moves freely in the opposite direction of the direction indicated by arrow 62. When lever 20 goes down, chain 60, which is positioned to form the shape of letter X, assisted by chain guide 63, at the crossing point, forces one way freewheel 66, which is fixed on shaft 40, to move in the direction of arrow 67, which is the same direction as the direction of arrow 57. One-way freewheel 66 moves freely in the opposite direction of arrow 67, without forcing chain 60 or shaft 40 to move. Therefore, when lever 20 goes up and down, shaft 40 rotates unidirectionally, forcing flywheel 70, which is fixed on shaft 40, to rotate always in one direction, which is indicated by arrows, 57 and 67. Gear 72, also fixed on shaft 40, forces generator's shaft 90, through chain 81, to rotate always in the same direction, which is indicated by arrow 91 thus generating electrical energy. Brake system 120 acts upon disk brake 110, which is fixed on shaft 30. Brake system 120 is activated only for a few moments, when float 10 is near its uppermost point, which is detected by controller 122 through the motion of shaft 30. Brake 120 detaches from disk brake 110 and releases lever 20, when one of the following two events happens first: (i) the wave recedes near to its lowermost point, detected by the controller through the motion of lever 20, or (ii) the wave is near to the base of float 10, detected by the controller, which monitors the total weight of lever 20 and float 10. Also, brake system 120 is activated only for a few moments, when float 10 is near its lowermost point, which is detected by controller 122, through the motion of shaft 30. Brake 120 detaches from disk brake 110 and releases lever 20, when one of the following two events happens first: (i) the wave elevates near to its uppermost point, detected by the controller through the motion of lever 20, or (ii) the wave is near to the top of float 10, detected by the controller through the buoyancy force, exercised on float 10.

Figure 3:
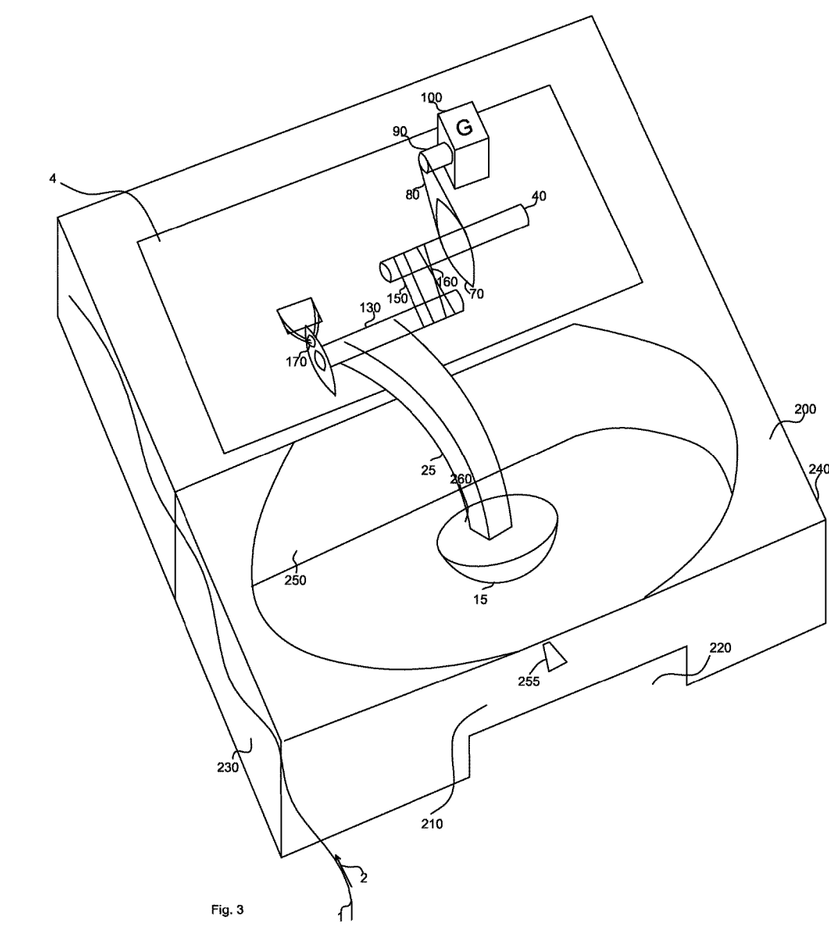

FIG. 3 Shows float 15, attached on lever 25 to move up and down in a caisson-like structure 200. Structure 200 comprises side walls 230 and 240, back wall 250 and front wall 210. The front wall has opening 220, which is positioned lower than the lowest wave. The waves, such as wave 1, move in the direction of arrow 2. Therefore, due to the principle of connected vessels, an oscillating water column, reciprocates up and down inside structure 200, due to the motion of the waves. Thus, float 15 reciprocates up and down in a protected environment supplied by structure 200. Also, since an oscillating water column moves float 15 up and down, the operational environment of float 15 becomes standardized, for all the areas with wave potential. Water level radar 255 monitors the water level approaching front wall opening 220 and transmits the data to the controller, which predicts the characteristics of the upcoming level of the oscillating water column inside structure 200 and optimizes the efficiency of the ocean wave energy converter.

Figure 4:
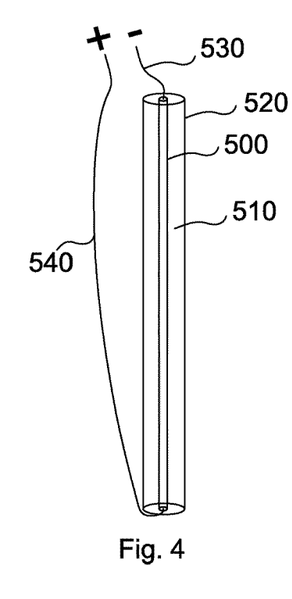

FIG. 4 shows cylinder 520, which contains a phase change material 510. It also contains an electric heating element 500, with electrical connectors 530 and 540. When the electrical connectors 530 and 540 are connected to a prime source of electricity the electric heating element 500 provides thermal energy to phase change material 510, inside cylinder 520. Cylinder 520, may also contain thermal conductive fins (not shown), supported on the inner wall of cylinder 520 and leaving enough space for the heating element 500.

Figure 5:
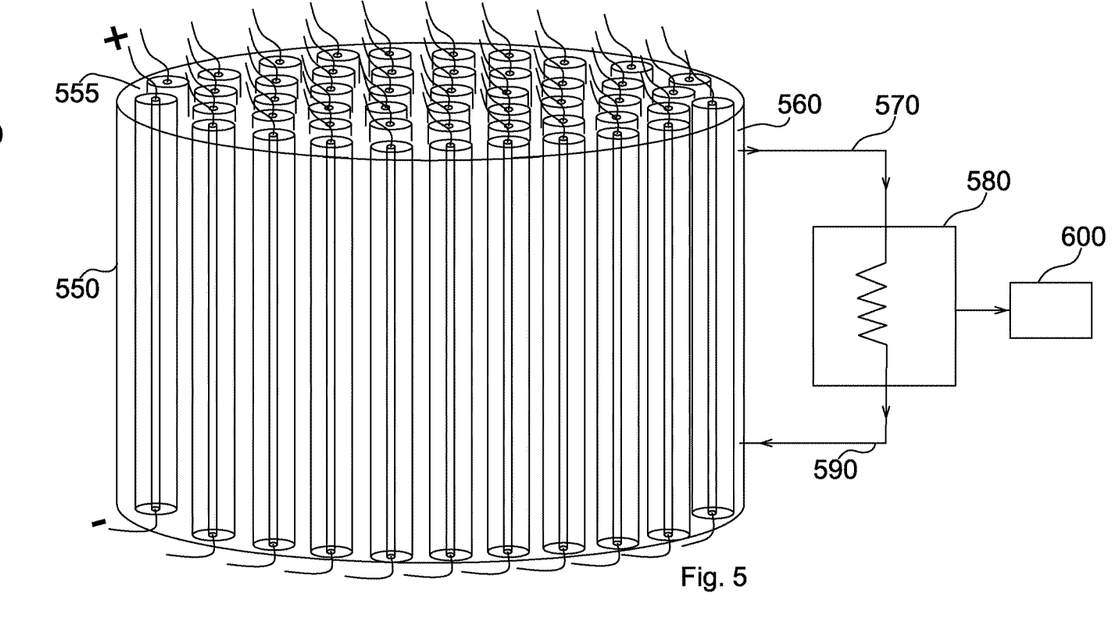
FIG. 5 shows a thermal energy storage and retrieval system

FIG. 5 shows a thermal energy storage system in accordance with an embodiment of the invention. The thermal energy storage system comprise storage tank 550 containing a plurality of cylinders 555 submerged in heat transfer fluid 560. Each one of the plurality of cylinders 555 contains enclosed phase change material and an electric heating element, with electrical connectors for connection with a prime electricity source. Thermal energy is added to tank 550 for thermal energy storage, when the electrical connectors, contained in the plurality of cylinders 555, are connected with an active prime source of electricity. That is, the active prime source of electricity activates the heating element in each one of the plurality of cylinders 555 and the heat produced is stored in the phase change material, which is also contained in each one of the plurality of cylinders 555. The thermal energy stored in each one of the plurality of cylinders 555, is transferred to heat transfer fluid 560, through the walls of each one of the plurality of cylinders 555. Thermal energy stored in tank 550 is extracted by extracting a portion of heat transfer fluid 560 from tank 550, removing the thermal energy from the extracted heat transfer fluid 560, and thereafter returning the cooled heat transfer fluid 560 back to tank 550. As shown in FIG. 5 heat transfer fluid 560 is extracted from tank 550 along flow path 570, cooled in heat exchanger 580, and thereafter returned to tank 550 along flow path 590. Heat transfer fluid 560 flowing through heat exchanger 580 transfers thermal energy to an external thermal energy converter 600. In an embodiment, thermal energy converter 600 is a steam generator, which drives a steam turbine in an electrical power plant.

A controller (not shown) controls the operation and optimization of thermal energy storage system depicted in FIG. 5 via components such as pumps, valves, sensors etc (not shown). The controller further optimizes a thermocline within heat transfer fluid 560 in tank 550. According to an embodiment, thermocline optimization occurs when changing the locations along the height of the tank 550, whereat heat transfer fluid 560 is extracted from tank 550 and returned to it and also varying the flow rates of heat transfer fluid 560 through heat exchanger 580.

The invention claimed is:
1. A float operated lever device for wave energy conversion comprising:
   a plurality of levers, each with an ocean end and a corresponding shaft end; each of said levers having a different length;
   each of said levers having an ocean buoyant float attached to their respective ocean end and a corresponding shaft fixed directly to their respective corresponding shaft end; each of said corresponding shafts individually mounted on a platform for pivotal rotation with the rise and fall of ocean waves, said platform being secured at a fixed position relative to the ocean waves, wherein said rise of ocean waves causes an up-stroke rotation of said corresponding shafts and said fall of ocean waves causes a down-stroke rotation of said corresponding shafts;
   mechanical means mounted for rotation on said platform, said mechanical means transferring unidirectional rotation to a common shaft from said up-stroke and down-stroke rotation of each corresponding shaft;
   braking means secured in fixed position relative to said platform for providing a temporary immobilization to at least one lever of the plurality of levers for a fraction of a half wave's period when said ocean buoyant float is nearly;
   (a) at a highest position, accumulating potential energy and then releasing said temporary immobilization when the ocean wave has moved to a lowest level; and
   (b) at a lowest position, accumulating potential energy due to buoyancy forces exerted on said ocean buoy- ant float and then releasing said temporary immobilization when the ocean wave has moved to a highest level;

whereby said rise and fall of ocean waves are converted into a useful unidirectional rotation.

2. The float operated lever device of claim 1 further including: a flywheel attached on said common shaft.

3. The float operated lever device of claim 1 further including: an electrical generator in rotational communication with said common shaft.

4. The float operated lever device of claim 1 wherein: said braking means comprises at least one braking system with a disk-brake attached on each said corresponding shaft and a controller for controlling said at least one braking system.

5. The float operated lever device of claim 1, wherein said mechanical means comprise at least one down-stroke freewheel attached on each corresponding shaft, at least one up-stroke freewheel attached on each corresponding shaft, at least one down-stroke freewheel attached on said common shaft, at least one additional down-stroke freewheel attached on said common shaft; at least one chain transferring homo-directionally said down-stroke rotation from said at least one down-stroke freewheel on each corresponding shaft to said at least one down-stroke freewheel on said common shaft, and at least one crosswise chain transferring counter-directionally said up-stroke rotation from said at least one up-stroke freewheel on each corresponding shaft to said at least one additional down-stroke freewheel on said common shaft; whereby said up-stroke and down-stroke rotations of each corresponding shaft is unidirectionally transferred to said common shaft.

\* \* \* \* \*